Patented Jan. 19, 1943

2,308,491

UNITED STATES PATENT OFFICE 2,308,491

PRESERVING WOODEN POLES AND POSTS

Edwin F. Conger, Staunton, Va.

No Drawing. Application February 24, 1939,
Serial No. 258,292

2 Claims. (Cl. 117—117)

This invention or discovery relates to preserving wooden poles and posts; and it comprises a method of preparing wet wooden poles and posts containing a dissolved potential preservative to fit them for immediate installation in the ground wherein a pole is impregnated under pressure with an aqueous solution containing chemicals in time reacting to produce insoluble preservative substances in the wood, as in impregnating a pole with a liquid containing zinc meta-arsenite kept in solution by acetic acid and immediately after impregnation and while the pole is still wet it is butt-dipped in a hot oil such as creosote whereby to produce local development of insolubles and protect the liquid in the butt against loss in the ground while leaving the rest of the pole bare for ordinary atmospheric seasoning; all as more fully hereinafter set forth and as claimed.

An object achieved in the present invention is to produce an economy as regards time and labor in preservative treatment of poles and posts. It is customary practice to impregnate wooden poles with various aqueous liquids containing potential insoluble preservative substances and to develop these insoluble preservative substances by long exposure of the wet poles to the air; usually by seasoning in sheds. In the seasoning operation the soluble substances in solution deliver insoluble preservatives. If the wet pole is immediately placed in the ground, the preservative in the butt is apt to be lost to the soil, either by absorption or by leaching. There is a loss of preservative substances whether the soil is wet or dry. In the popular "ZMA" treatment the insoluble preservative is zinc meta-arsenite. In the liquid used for impregnating the pole it is kept in solution by the solvent action of acetic acid. In seasoning acetic acid is lost to the air by volatilization. This is slow. In the present invention the butt of the pole, or the portion in the ground, is protected by a treatment with hot creosote, while the rest of the pole is left exposed for seasoning by the atmosphere. The top part of the pole is seasoned by the atmosphere and the protective substances developed in place.

It is a problem in the art to treat wooden telephone and telegraph poles to make them have a long service life in use. The problem is difficult because of the many organic and biological causes of deterioration of poles and because of the wide variety of climatic conditions in which the poles are used; climatic conditions ranging from torrid to frigid and from arid to humid. In all climates a variety of organisms, ranging from fungi to insects, prey on the wood. A good preservative for a pole must be poisonous to all sorts of organisms; it must be fungicidal as well as insecticidal and it must be of such nature that it will not be removed from the pole by moisture. The difficulty in making well preserved poles is aggravated by the fact that part of the pole is buried in the ground and part extends into the air. The conditions surrounding the two parts of the pole are quite different. Some treatments are known which afford a high degree of protection but are ruled out because of their cost. For economical reasons the cost of a treated pole must be kept low and any treatment is at a disadvantage which materially increases the cost, either by using expensive chemical agents or by introducing the necessity for inordinately long seasoning periods or for excessive handling.

In preserving poles, impregnation with solutions of various simple salts was formerly much used but these were subject to leaching difficulties and other disadvantages. Creosoting a pole gives excellent protection against some but not all causes of deterioration.

One of the best methods of preserving poles is the so-called Curtin zinc meta-arsenite or ZMA process. In the ZMA process the pole is impregnated with an aqueous solution containing the constituents of zinc meta-arsenite kept in solution with acetic acid. When a pole is treated in this manner and left in the air, the acetic acid gradually volatilizes and escapes to the air with increase in basicity and production of an insoluble precipitate of a constitution corresponding to the formula of zinc meta-arsenite, disseminated throughout the wood. The action takes some time, since it depends on aeration. When the action is complete the pole is effectively preserved against various forms of insect and bacterial attack. After its formation the precipitate is not washed out by showers.

The present invention may be regarded in part as an improvement on the Curtin process, and relates to a process in which the necessity for aging and seasoning the ZMA-treated poles by long exposure to air, and the extra handling steps made necessary thereby, are done away with. I find that, contrary to expectation, if a plain zinc meta-arsenite treated pole is set up in the ground without due seasoning, the part of the pole that suffers is not the above-ground part exposed to rain, but instead is the underground part; the butt end which is exposed to the leaching effect of earth moisture and the absorbent action of dry earth.

I have further discovered that the reaction of the impregnant to form solid zinc meta-arsenite can be accelerated so as to be substantially complete locally, within a few minutes rather than in days, by immersing the butt end of the pole for a short time in a hot water-immiscible liquid at a temperature above the boiling point of aqueous zinc meta-arsenite solutions; somewhat above 212° F. The hot liquid may be creosote or petroleum or various combinations of petroleum and creosote. Or there may be employed, singly or in combination, animal and vegetable oils, creosote distillates, or petroleum distillates, which are so free from carbonized and colored components that they appear virtually colorless on the pole. For the hot liquid I regard it as generally best to use creosote, which not only affords the accelerating action desired but also affords desirable additional protection to the buried or ground line part of the pole. By proper manipulation the creosote can be caused to penetrate a predetermined distance into the butt end and remain permanently.

The pole treated according to the invention contains insoluble zinc meta-arsenite in the lower butt portion, further protected by a cylindrical shell of creosote impregnant, while the upper part of the pole contains zinc meta-arsenite precipitating on exposure to air. The pole is ready to be shipped on open flat cars and installed in the ground immediately after the creosoting. There is no seasoning period required. The part of the pole that is buried contains the completed insoluble precipitate, further protected by creosote.

In the first step of the process, a batch of poles is impregnated with a potential zinc meta-arsenite solution applied under pressure in such manner that the pores of the wood are substantially saturated with solution. Impregnation may be by the full-cell process or by the well-known Lowry and Rueping methods. In the second step, the batch of poles is immediately transferred to a hot creosote vat at a temperature well above the boiling point of the solution and the butts immersed therein a suitable distance, say 6 or 8 feet, to secure creosote protection up to about 2 feet above ground line. The creosote enters the outer layers of the wood to a moderate depth and steam and acetic acid vapors escape from the butt face. After a suitable time the poles are withdrawn, drained and stacked ready for shipment.

Inspection of the poles immediately after the creosote treatment shows that the part of the poles which has been immersed in the creosote contains largely insolubilized zinc meta-arsenite, surrounded by a shell of creosote which protects any unprecipitated reagent from the leaching effect of moisture. The pole may be set up in the ground immediately and gives excellent service.

In a specific example illustrative of the preservation of poles according to the process of the invention, a batch of seasoned southern yellow pine poles were taken, each pole being about 35 feet long and 12 inches in diameter at the butt. The poles were placed in a conventional hermetically sealable treating vat, and the vat put under a reduced pressure equivalent to 24 inches of mercury to exhaust the pores of the wood. There was prepared (Curtin Patent 1,659,135 and Curtin and Thordarson Patent 1,984,254) a solution containing dissolved arsenious oxide in concentration of about 1.4 per cent, dissolved zinc acetate in amount at least chemically equivalent to the arsenious oxide present, with reference to the formation of zinc meta-arsenite $Zn(AsO_2)_2$ and sufficient free acetic acid to inhibit precipitation of zinc meta-arsenite until after the solution is introduced into the wood. The batch of solution was introduced in amount sufficient to submerge the poles. The temperature of the solution was maintained at about 70 F. and 170 pounds pressure was applied to the tank to force the solution into the pores of the wood. These conditions were maintained for three hours, and the poles became practically uniformly impregnated throughout their sapwood. Then the solution was discharged from the vat and the poles allowed to drain.

In the next step, the poles, still moist and warm, were introduced for about eight feet of their length into an open vat of commercial creosote maintained at a temperature of about 220° to 230° F., and left there for ninety minutes for local impregnation to take place. There was some escape of steam and acetic acid vapors from the butt faces. The temperature of the oil was reduced to about 110° F. and the poles were subjected to this reduced oil temperature for another hour.

The poles were then removed and drained. Inspection thereof showed the butts of the poles to be uniformly impregnated with creosote to the proper depth and to contain fixed (insolubilized) zinc meta-arsenite in the part of the pole which had been dipped in creosote. The poles were in condition for immediate installation.

In lieu of using a ZMA solution in the first step, other equivalent aqueous solutions adapted to form insoluble toxic precipitates can be used, for example the solutions of Curtin Patents 1,624,930 and 1,620,152, Wolman Patents 1,957,872 and 1,957,873 and the so-called chromated zinc chloride solutions. In all these treating methods, the liquor is a clear aqueous solution when it is introduced into the pole. Afterwards, in the seasoning operation, water escapes to the air and precipitates are formed in the wood. The action is quite the same as in the ZMA treatment except that acetic acid is not the solvent.

The invention has been described primarily in reference to telegraph and telephone poles but it is, of course, applicable to the treatment of electric power line poles and posts, fence posts, trestle supports, etc. where the same problems are encountered. The greatest economies and advantages of the invention are realized when the ZMA-treated poles are butt-dipped in creosote immediately after impregnation, but there are advantages in butt-dipping the ZMA-treated poles at any time after impregnation.

What I claim is:

1. The method of preserving wooden poles and posts intended to be partly buried in the ground which comprises impregnating the pole or post with an aqueous solution including a preservative reagent held in solution by a volatile acid material and adapted, upon release of the volatile acid material, to result in fixation of a difficultly soluble preservative compound in and on the fibres and immersing that portion only of the pole or post which is to be buried in the ground and while still moist with the aforesaid solution, into an open body of oil heated to a temperature substantially above the boiling point of the solution for a sufficient length of time to effect superficial penetration of the oil and accelerate local fixation of said preservative compound in the fibres and cooling said oil while the pole is immersed therein.

2. The method of preserving wooden poles and posts intended to be partly buried in the ground which comprises impregnating the pole or post with an aqueous solution including a preservative reagent held in solution by a volatile acid material and adapted, upon release of the volatile acid material, to result in the formation of a relatively insoluble zinc meta arsenite precipitate in and on the fibres and immersing that portion only of the pole or post which is to be buried in the ground and while still moist with the aforesaid solution, into an open body of oil heated to a temperature substantially above the boiling point of the solution for a sufficient length of time to effect superficial penetration of the oil and accelerate local fixation of said zinc meta arsenite in the fibres and cooling said oil while the pole is immersed therein.

EDWIN F. CONGER.